(12) United States Patent
Doi (10) Patent No.: US 10,737,579 B2
(45) Date of Patent: Aug. 11, 2020

(54) COIL UNIT (71) Applicant: Toyota Jidosha Kabushiki Kaisha, Toyota-shi, Aichi-ken (JP)

(72) Inventor: Taiga Doi, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/103,425

(22) Filed: Aug. 14, 2018

(65) Prior Publication Data

US 2019/0054828 A1 Feb. 21, 2019

(30) Foreign Application Priority Data

Aug. 15, 2017 (JP) .................. 2017-156757

(51) Int. Cl.
| | |
|---|---|
| B60L 11/18 | (2006.01) |
| H02J 50/12 | (2016.01) |
| B60L 53/12 | (2019.01) |
| H01F 38/14 | (2006.01) |
| H04B 5/00 | (2006.01) |
| H01F 27/28 | (2006.01) |
| H02J 5/00 | (2016.01) |
| B60L 53/38 | (2019.01) |
| H01F 27/36 | (2006.01) |
| H01F 27/02 | (2006.01) |

(52) U.S. Cl.
CPC .............. *B60L 53/12* (2019.02); *B60L 53/38* (2019.02); *H01F 27/02* (2013.01); *H01F 27/2871* (2013.01); *H01F 27/367* (2013.01); *H01F 38/14* (2013.01); *H02J 5/005* (2013.01); *H02J 50/12* (2016.02); *H04B 5/0037* (2013.01); *H04B 5/0075* (2013.01); *H04B 5/0081* (2013.01); *B60L 2230/10* (2013.01)

(58) Field of Classification Search
CPC .. H02J 5/005; H02J 50/10; H02J 50/12; H02J 7/025
USPC ............................................ 320/10; 307/104
See application file for complete search history.

(56) References Cited

U.S. PATENT DOCUMENTS

| | | | |
|---|---|---|---|
| 7,741,734 B2 | 6/2010 | Joannopoulos et al. | |
| 2007/0222542 A1 | 9/2007 | Joannopoulos et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0230777 A1* | 9/2009 | Baarman | H01F 38/14 307/104 |

(Continued)

FOREIGN PATENT DOCUMENTS

| | | |
|---|---|---|
| AU | 2006269374 B2 | 10/2009 |
| AU | 2007349874 A2 | 1/2010 |

(Continued)

*Primary Examiner* — David V Henze-Gongola
(74) *Attorney, Agent, or Firm* — Dinsmore & Shohl LLP (57) ABSTRACT

A coil unit includes a case (an upper cover) made of a resin, the case including an attachment surface to be attached to a case of a power storage apparatus, a metal plate provided in the case, a coil located opposite to the attachment surface with respect to the metal plate, and a metal member arranged to surround a space portion located between the metal plate and the case (the upper cover). The metal member is formed integrally with the upper cover made of the resin.

3 Claims, 6 Drawing Sheets

(56) References Cited

U.S. PATENT DOCUMENTS

| | | |
|---|---|---|
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2013/0127409 A1 | 5/2013 | Ichikawa |
| 2013/0193749 A1 | 8/2013 | Nakamura et al. |
| 2015/0008877 A1 | 1/2015 | Ichikawa et al. |
| 2018/0198310 A1* | 7/2018 | Hwang .............. H05K 9/00 |
| 2019/0221353 A1* | 7/2019 | Hwang .............. C09D 7/61 |

FOREIGN PATENT DOCUMENTS

| | | |
|---|---|---|
| AU | 2010200044 A1 | 1/2010 |
| AU | 2006269374 C1 | 3/2010 |
| CA | 2615123 A1 | 1/2007 |
| CA | 2682284 A1 | 10/2008 |
| CN | 101258658 A | 9/2008 |
| CN | 101682216 A | 3/2010 |
| CN | 101860089 A | 10/2010 |
| EP | 1902505 A2 | 3/2008 |
| EP | 2130287 A1 | 12/2009 |
| IN | 735/DELNP/2008 | 5/2008 |
| IN | 6195/DELNP/2009 | 7/2010 |
| JP | 2009-501510 A | 1/2009 |
| JP | 2013-110822 A | 6/2013 |
| JP | 2013-126327 A | 6/2013 |
| JP | 2013-146148 A | 7/2013 |
| JP | 2013146154 A | 7/2013 |
| JP | 2013154815 A | 8/2013 |
| JP | 2016-092214 A | 5/2016 |
| KR | 20080031398 A | 4/2008 |
| KR | 20100015954 A | 2/2010 |
| WO | 2007008646 A2 | 1/2007 |
| WO | 2008118178 A1 | 10/2008 |

* cited by examiner

COIL UNIT

CROSS-REFERENCE TO RELATED APPLICATIONS

This nonprovisional application claims priority to Japanese Patent Application No. 2017-156757 filed with the Japan Patent Office on Aug. 15, 2017, the entire contents of which are hereby incorporated by reference.

BACKGROUND

Field

The present disclosure relates to a coil unit and particularly to a coil unit included in an electric power transmission system which transmits electric power from an electric power transmission apparatus to an electric power reception apparatus in a contactless manner.

Description of the Background Art

Japanese Patent Laying-Open No. 2016-92214 discloses a coil unit included in an electric power transmission system which transmits electric power from an electric power transmission apparatus to an electric power reception apparatus in a contactless manner. The coil unit includes a coil, an electrical instrument, a metal member (an electromagnetic shield member) arranged around the electrical instrument, and a case made of a resin which accommodates these components.

SUMMARY

A resin is unable to cut off electromagnetic field. Therefore, in arranging an electrical instrument in a case made of a resin, a metal member configured to cut off electromagnetic field is desirably provided in the case in order to suppress influence on the electrical instrument by the electromagnetic field. When a metal member as in Japanese Patent Laying-Open No. 2016-92214 is arranged for each electrical instrument, however, the number of components accommodated in the case increases, which may lead to disadvantageous increase in size of a coil unit.

The present disclosure was made to solve the problems described above and an object thereof is to suppress increase in size of a coil unit in which a coil is accommodated in a case made of a resin while a space where an electrical instrument is arranged is secured in the case.

(1) A coil unit according to the present disclosure is to be attached to an externally provided attachment target member, and the coil unit includes a case made of a resin, the case including an attachment surface to be attached to the attachment target member, a metal plate provided in the case, a coil located opposite to the attachment surface with respect to the metal plate, and a metal member arranged between the metal plate and the attachment surface and formed integrally with the case. The metal member is arranged to surround a space located between the metal plate and the case.

According to the construction, the metal member is arranged to surround the space between the metal plate and the case. Entry of electromagnetic field generated from the coil into the space between the metal plate and the case by going around the metal plate is suppressed. Therefore, the space between the metal plate and the case can be made use of as an electrical instrument arrangement space which is less likely to be affected by electromagnetic field. The metal member is formed integrally with the case made of the resin. Therefore, the number of components accommodated in the case is smaller than in an example in which a metal member separate from the case is arranged for each electrical instrument. Consequently, increase in size of the coil unit in which a coil is accommodated in the case made of the resin can be suppressed while a space where an electrical instrument is arranged is secured in the case.

(2) In one embodiment, the case is attached to the attachment target member with a fastening member. The attachment surface of the case is provided with an insert portion where the metal member is provided and a fastening portion pressed against the attachment target member by fastening force from the fastening member while the case is attached to the attachment target member. The insert portion of the attachment surface protrudes outward relative to the fastening portion of the attachment surface while the case is not attached to the attachment target member.

According to the construction, the insert portion of the attachment surface (a portion where the metal member is provided) protrudes outward relative to the fastening portion of the attachment surface while the case is not attached to the attachment target member. Therefore, in attachment of the case to the attachment target member, the insert portion interferes with the attachment target member before the fastening portion. As fastening force from the fastening member is thereafter increased, the fastening portion is pressed against the attachment target member with a portion between the fastening portion and the insert portion in the case being elastically deformed. Thus, while the case is attached to the attachment target member (the fastening portion is pressed against the attachment target member), the insert portion can be pressed against the attachment target member by elastic force of the elastically deformed portion in the case. Therefore, a gap between the insert portion and the attachment target member in the attachment surface can be reduced. Consequently, entry of electromagnetic field generated from the coil into the space between the metal plate and the case by going around the metal plate can appropriately be suppressed.

(3) In one embodiment, the attachment target member is made of a metal. The metal member is exposed through the case in the insert portion of the attachment surface.

According to the construction, the metal member is exposed through the case in the insert portion of the attachment surface. Therefore, the metal member exposed at the insert portion of the attachment surface can directly be pressed against the attachment target member made of a metal while the case is attached to the attachment target member. Therefore, entry of electromagnetic field generated from the coil into the space between the metal plate and the case by going around the metal plate can more appropriately be suppressed.

The foregoing and other objects, features, aspects and advantages of the present disclosure will become more apparent from the following detailed description of the present disclosure when taken in conjunction with the accompanying drawings.

DESCRIPTION OF THE EMBODIMENTS

An embodiment of the present disclosure will be described below in detail with reference to the drawings. Though a plurality of embodiments will be described below, combination as appropriate of features described in each embodiment is originally intended. The same or corresponding elements in the drawings have the same reference characters allotted and description thereof will not be repeated.

Figure 1:
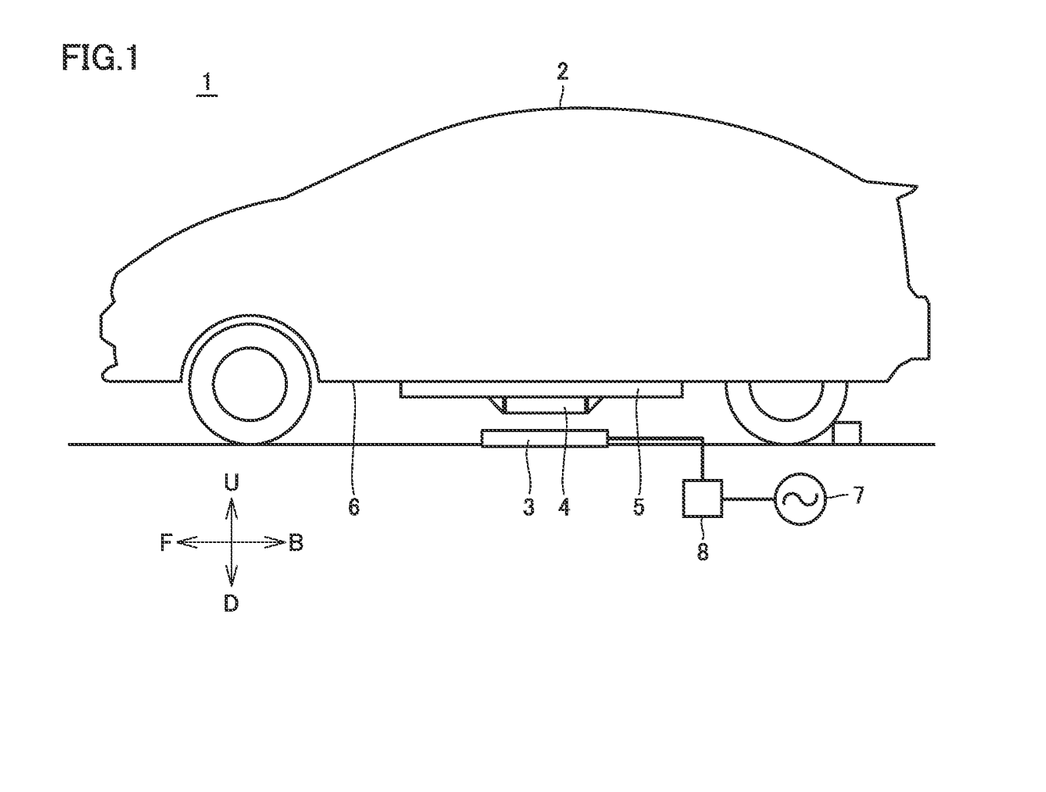
FIG. 1 is a general view of an electric power transmission system to which a coil unit is applied.

FIG. 1 is a general view of an electric power transmission system 1 to which a coil unit according to an embodiment of the present disclosure is applied. Though an example in which the coil unit is applied to electric power transmission system 1 which transmits electric power from an electric power transmission facility outside a vehicle to the vehicle in a contactless manner is representatively described below, applications of the coil unit according to the present disclosure are not limited to the electric power transmission system for vehicles but can be applied also to other electric power transmission systems. In the following, a direction shown with an arrow U in FIG. 1 may be referred to as "upward" or an "upper surface" and a direction shown with an arrow D may be referred to as "downward" or a "lower surface."

Electric power transmission system 1 includes a vehicle 2 and a coil unit 3 for electric power transmission. Coil unit 3 is set on the ground. Vehicle 2 includes a coil unit 4 for electric power reception and a power storage apparatus 5. Power storage apparatus 5 is arranged on a lower surface of a floor panel 6 of vehicle 2. Coil unit 4 is attached to a lower surface of a case (made of a metal) of power storage apparatus 5.

Coil unit 3 for electric power transmission receives supply of electric power from a power supply portion 8. Power supply portion 8 receives electric power from an alternating-current (AC) you supply 7 (for example, a commercial system power supply), generates AC power of a prescribed transmission frequency, and supplies electric power to coil unit 3. Coil unit 3 is configured to transmit electric power in a contactless manner to coil unit 4 through magnetic field while vehicle 2 is positioned such that coil unit 4 of vehicle 2 is opposed to coil unit 3.

Coil unit 4 for electric power reception is configured to receive electric power transmitted in a contactless manner from coil unit 3 through magnetic field while vehicle 2 is positioned such that coil unit 4 is opposed to coil unit 3. Electric power received by coil unit 4 is stored in power storage apparatus 5.

Figure 2:
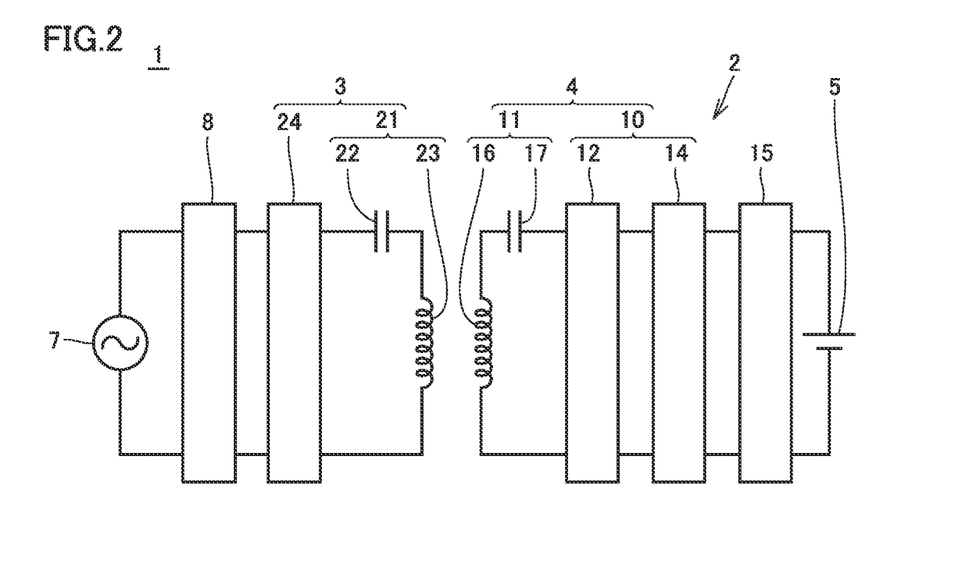
FIG. 2 is a diagram showing an electrical configuration of the electric power transmission system.

FIG. 2 is a diagram showing an electrical configuration of electric power transmission system 1 shown in FIG. 1. Coil unit 3 for electric power transmission includes a filter circuit 24 and a resonant circuit 21. Filter circuit 24 is provided between power supply portion 8 and resonant circuit 21 and suppresses harmonic noise generated from power supply portion 8. Filter circuit 24 is implemented, for example, by an LC circuit including an inductor and a capacitor.

Power supply portion 8 includes, for example, a power factor correction (PFC) circuit and an inverter which converts direct-current (DC) power received from the PFC circuit into AC power of a prescribed transmission frequency (for example, several ten kHz).

Resonant circuit 21 includes a coil 23 and a capacitor 22. Being connected in series to coil 23, capacitor 22 forms a resonator together with coil 23. In some embodiments, a Q value representing resonance intensity of the resonator implemented by coil 23 and capacitor 22 is not smaller than 100. Capacitor 22 may be connected in parallel to coil 23, and when a desired resonant state is formed only by coil 23, capacitor 22 does not have to be provided.

Vehicle 2 includes coil unit 4 for electric power reception, a relay 15, and power storage apparatus 5. Coil unit 4 includes a resonant circuit 11 and an instrument 10. Instrument 10 includes a filter circuit 12 and a rectification circuit 14.

Resonant circuit 11 includes a coil 16 and a capacitor 17. Being connected in series to coil 16, capacitor 17 forms a resonator together with coil 16. In some embodiments, a Q value of the resonator implemented by coil 16 and capacitor 17 is also not smaller than 100. Capacitor 17 may also be connected in parallel to coil 16, and when a desired resonant state is formed only by coil 16, capacitor 17 does not have to be provided.

Filter circuit 12 is provided between resonant circuit 11 and rectification circuit 14 and suppresses harmonic noise generated at the time of electric power reception by resonant circuit 11. Filter circuit 12 is implemented, for example, by an LC circuit including en inductor and a capacitor. Rectification circuit 14 rectifies AC power received by resonant circuit 11 and outputs rectified AC power to power storage apparatus 5. Rectification circuit 14 includes a smoothing capacitor together with a rectifier.

Power storage apparatus 5 is a rechargeable DC power supply which stores electric power for a high voltage system for generating driving force for vehicle 2. Power storage apparatus 5 includes a secondary batter such as a lithium ion battery or a nickel-metal hydride battery. Power storage apparatus 5 stores electric power output from rectification circuit 14 during electric power reception by coil unit 4. Power storage apparatus 5 supplies stored electric power to a not-shown motive power generator.

Relay 15 is provided between rectification circuit 14 and power storage apparatus 5. Relay 15 is turned on (rendered conductive) during electric power reception by coil unit 4. Relay 15 is provided, for example, in a case of power storage apparatus 5.

In electric power transmission system 1, AC power of a prescribed transmission frequency is supplied from power supply portion 8 to coil unit 3. Each of coil unit 3 and coil unit 4 of vehicle 2 includes a coil and a capacitor and is designed to resonate at a transmission frequency. As AC power is supplied from power supply portion 8 to coil unit 3, energy (electric power) is transferred from coil unit 3 to coil unit 4 through magnetic field formed between coil 23 of coil unit 3 and coil 16 of coil unit 4 of vehicle 2. Energy (electric power) transferred to coil unit 4 is supplied to power storage apparatus 5 through instrument 10.

Figure 3:
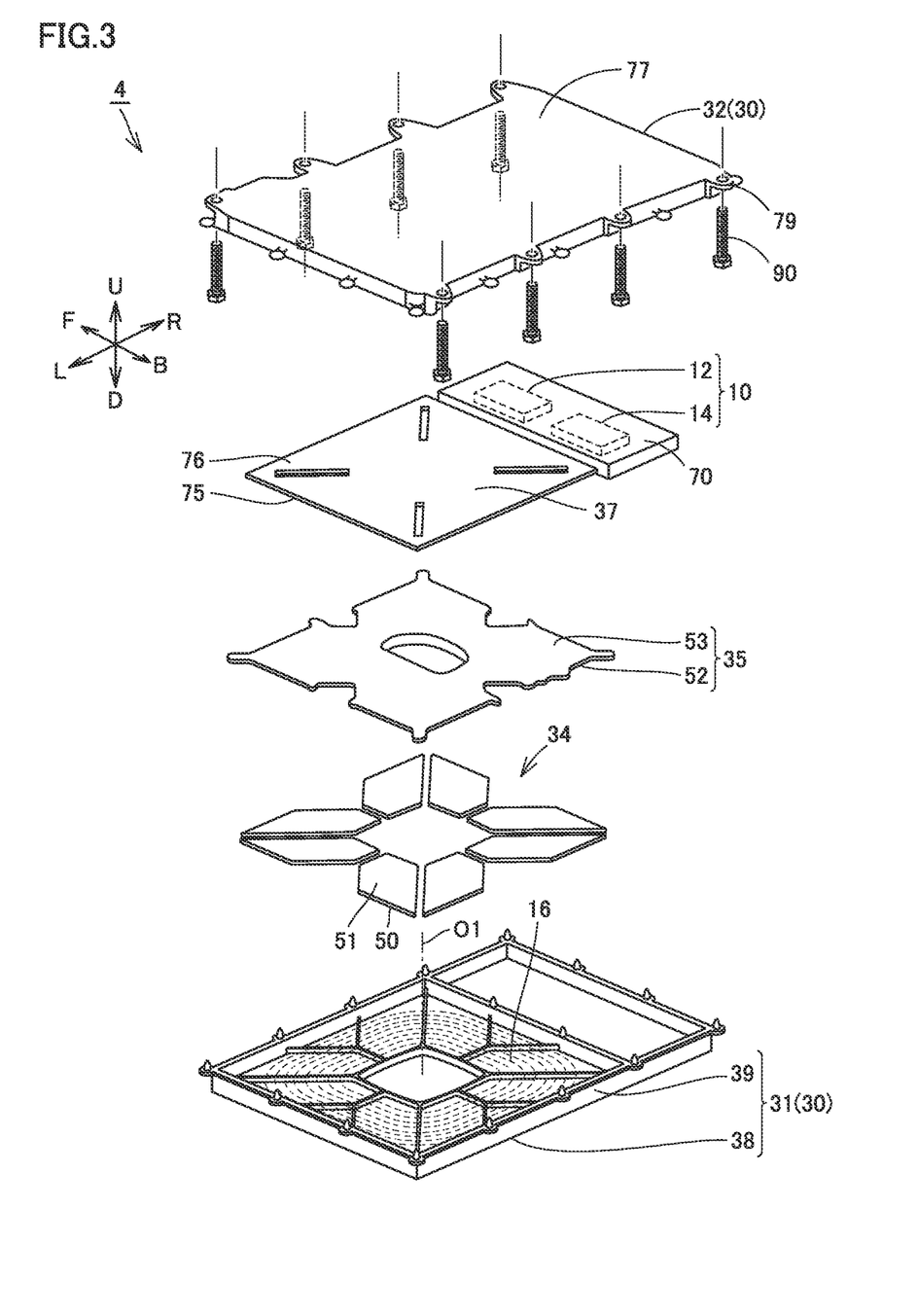
FIG. 3 is an exploded perspective view of the coil unit.

FIG. 3 is an exploded perspective view of coil unit 4. Coil unit 4 for electric power reception is representatively described in the present embodiment. A construction of coil unit 4 according to the present embodiment can also be applied to coil unit 3 for electric power transmission.

Coil unit 4 includes a case 30, coil 16, a ferrite plate 34, a metal plate 35, a sensor substrate 37, and a storage case 70.

Case 30 is composed of a resin and includes a lower cover 31 and an upper cover 32. Lower cover 31 is arranged on a side of a lower surface of coil unit 4. Upper cover 32 is arranged on a side of an upper surface of coil unit 4.

Lower cover 31 includes a lower wall 38 and a sidewall 39. Sidewall 39 is formed to be erected upward from an outer peripheral edge portion of lower wall 38.

Coil 16 is formed integrally with lower cover 31 by insert molding and embedded in lower wall 38. Coil 16 is a flat coil formed by helically winding a coil wire so as to surround a vertically extending axis of winding O1. A hollow portion is provided in a central portion of coil 16. Though a helical flat coil is adopted for coil 16 in the example shown in FIG. 3, a coil in various shapes can be adopted for coil 16.

Ferrite plate 34 is arranged on an upper surface of lower wall 38 of lower cover 31. Ferrite plate 34 is provided as a core of coil 16 (ferrite core). Ferrite plate 34 is formed like a plate and includes a coil carrying surface 50 and a rear surface 51. Coil 16 is arranged on a side of coil carrying surface 50. Metal plate 35 is arranged on a side of rear surface 51.

Metal plate 35 is arranged on the side of rear surface 51 of ferrite plate 34. Metal plate 35 is composed of a metal such as aluminum or an aluminum alloy. Metal plate 35 is formed like a plate and includes a lower surface 52 and an upper surface 53.

Sensor substrate 37 is a substrate where a circuit for a low voltage system which performs signal processing, such as a voltage sensor and a current sensor (neither of which is shown) configured to detect electric power supplied from coil 16 to power storage apparatus 5, is arranged.

Sensor substrate 37 is arranged on upper surface 53 of metal plate 35. Sensor substrate 37 is formed like a plate and includes a lower surface 75 and an upper surface 76.

Storage case 70 is arranged laterally to sensor substrate 37 (on an outer peripheral side of coil 16). Storage case 70 stores some of electrical instruments for a high voltage system connected between coil 16 and power storage apparatus 5, such as filter circuit 12 or rectification circuit 14. Storage case 70 is composed of a metal such as aluminum or an aluminum alloy.

Upper cover 32 is arranged on a side of upper surface 76 of sensor substrate 37 and a side of an upper surface of storage case 70. Combination of upper cover 32 with lower cover 31 forms case 30.

Upper cover 32 includes an attachment surface (upper surface) 77 to be attached to the lower surface of the case (an attachment target member) made of a metal of power storage apparatus 5. A plurality of fastening portions 79 pressed against the case of power storage apparatus 5 by fastening force from a bolt (a fastening member) 90 are provided on attachment surface 77 of upper cover 32. Upper cover 32 is attached to the case of power storage apparatus 5 as the plurality of fastening portions 79 are pressed against the case of power storage apparatus 5 by a plurality of bolts 90.

Figure 4:
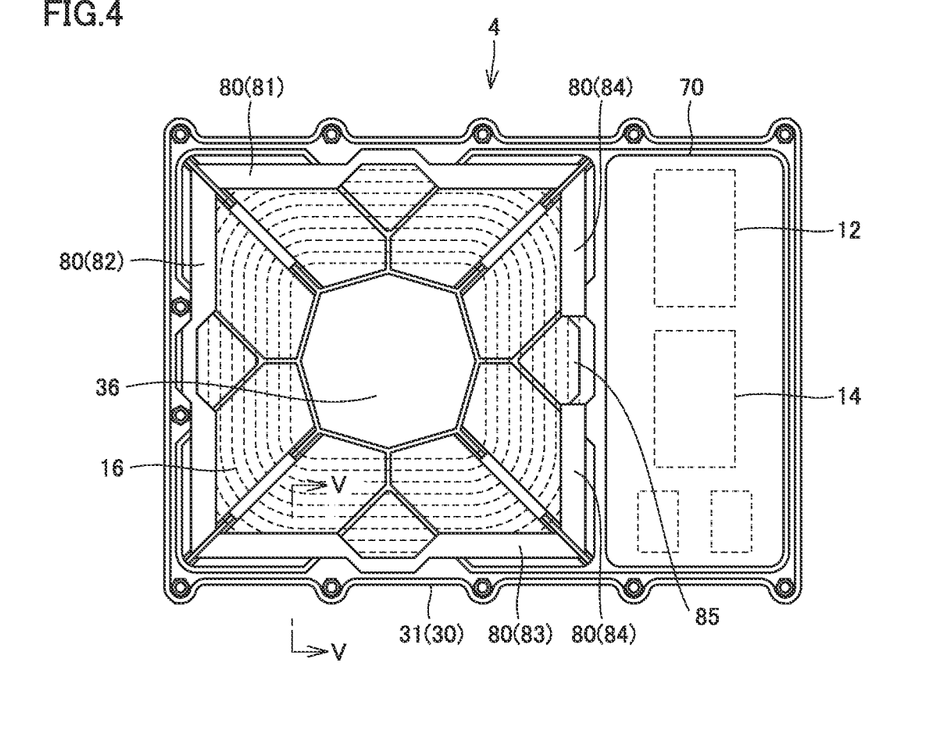
FIG. 4 is a perspective view (No. 1) of the coil unit viewed from above.

FIG. 4 is a perspective view of coil unit 4 viewed from above. The construction of coil unit 4 according to the present embodiment is further described with reference to FIG. 4.

Coil unit 4 includes a metal member (a shield member) 80 in addition to the features shown in FIG. 3 described above. As shown in FIG. 4, metal member 80 is arranged like a frame to surround a substantially rectangular space portion 36 located between metal plate 35 and case 30 (upper cover 32). FIG. 4 does not show metal plate 35, sensor substrate 37, and upper cover 32 in order to facilitate understanding of two-dimensional positional relation between coil 16 and metal member 80.

Metal member 80 includes first to fourth metal members 81 to 84 arranged on four sides of space portion 36, respectively. Though first to fourth metal members 81 to 84 are separate from one another in the example shown in FIG. 4, they may be coupled to one another without being separated.

In the present embodiment, fourth metal member 84 adjacent to storage case 70 of first to fourth metal members 81 to 84 is divided into two parts with a discontinuous portion 85 being interposed. In discontinuous portion 85, a harness which electrically connects an electrical instrument in space portion 36 (sensor substrate 37) and an electrical instrument in storage case 70 (filter circuit 12) to each other is arranged.

Metal member 80 (first to fourth metal members 81 to 84) is formed integrally with upper cover 32 so as to surround space portion 36.

Figure 5:
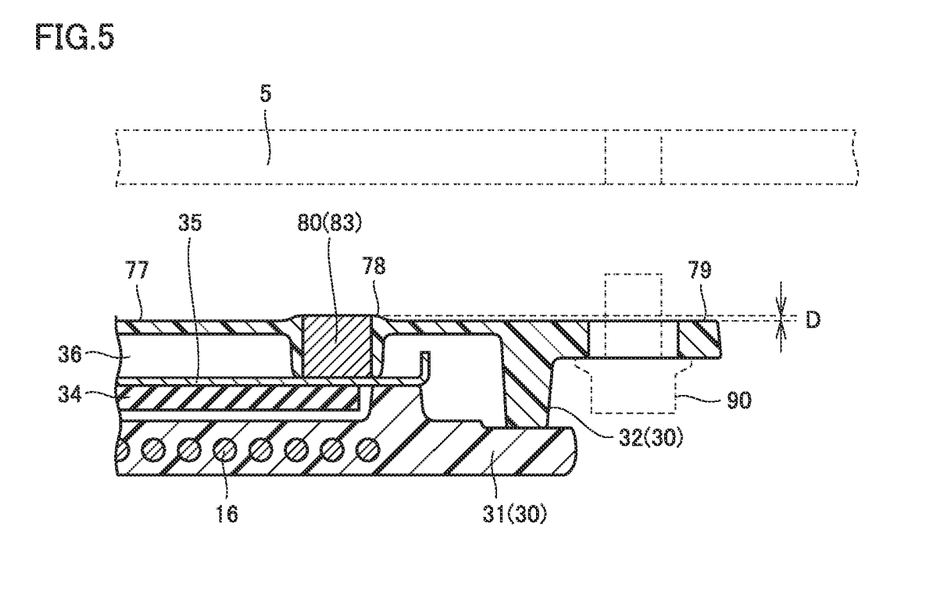
FIG. 5 is a cross-sectional view (No. 1) along the line V-V in FIG. 4.

FIG. 5 is a cross-sectional view along the line V-V in FIG. 4 while upper cover 32 is not attached to the case of power storage apparatus 5.

Metal member 80 (third metal member 83 in the example shown in FIG. 5) is arranged around space portion 36 so as to surround space portion 36. Metal member 80 suppresses entry of electromagnetic field generated from coil 16 into space portion 36 by going around metal plate 35. Therefore, space portion 36 can be made use of as an electrical instrument arrangement space which is less likely to be affected by electromagnetic field. In the present embodiment, space portion 36 is made use of as a space where sensor substrate 37 (an electrical instrument) is arranged. Metal member 80 is formed integrally with upper cover 32 made of a resin. Therefore, the number of components accommodated in case 30 is smaller than in an example in which a metal member separate from upper cover 32 is provided. Consequently, increase in size of coil unit 4 can be suppressed while an electrical instrument arrangement space is secured in case 30 made of a resin.

Attachment surface 77 of upper cover 32 is provided with an insert portion 78 with which metal member 80 is integrally formed and fastening portion 79 located on an outer peripheral side of coil 16 relative to insert portion 78. In insert portion 78 of attachment surface 77, metal member 80 is not covered with a resin but is exposed through upper cover 32. Metal member 80 is not covered with a resin on a side of metal plate 35 but is in direct contact with metal plate 35.

Insert portion 78 of attachment surface 77 protrudes upward by a distance D relatively to fastening portion 79 of attachment surface 77 while upper cover 32 is not attached to the case of power storage apparatus 5. Distance D is set to a small value in order to allow a portion between fastening portion 79 and insert portion 78 in upper cover 32 to elastically deform (but not to such an extent as allowing plastic deformation) while upper cover 32 is attached to the case of power storage apparatus 5.

Figure 6:
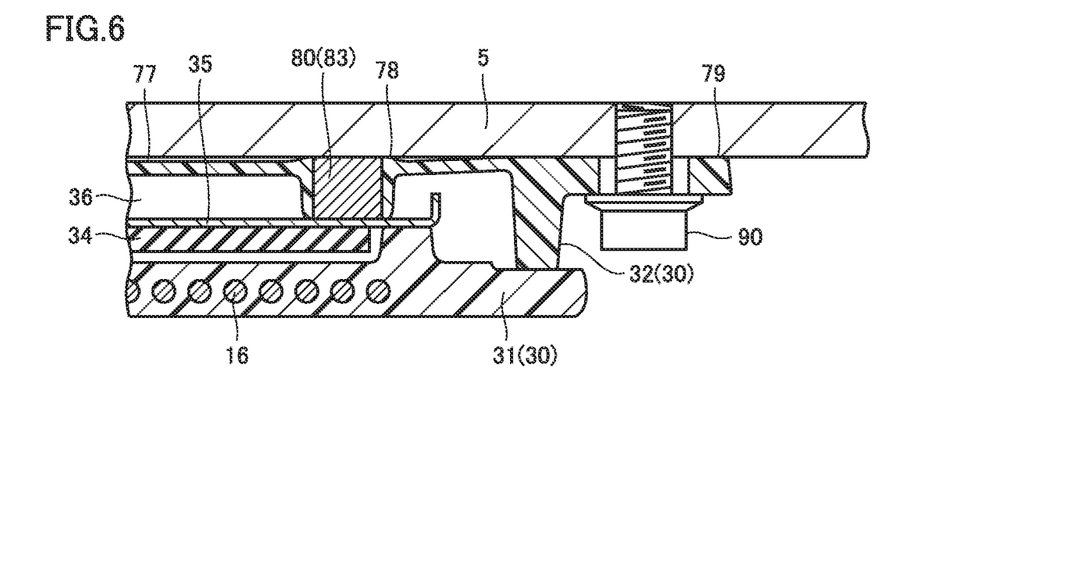
FIG. 6 is a cross-sectional view (No. 2) along the line V-V in FIG. 4.

FIG. 6 is a cross-sectional view along the line V-V in FIG. 4 while upper cover 37 is attached to the case of power storage apparatus 5.

As shown in FIG. 5 described above, while upper cover 32 is not attached to the case of power storage apparatus 5 (the state shown in FIG. 5), insert portion 78 protrudes upward by distance D relatively to fastening portion 79. Therefore, in attaching upper cover 32 to the case of power storage apparatus 5, insert portion 78 interferes with the case of power storage apparatus 5 before fastening portion 79.

With further increase in fastening force from bolt 90 while insert portion 78 interferes with the case of power storage apparatus 5, fastening portion 79 is pressed against the case of power storage apparatus 5 while the portion between fastening portion 79 and insert portion 78 in upper cover 32 is elastically deformed.

Therefore, while upper cover 32 is attached to the case of power storage apparatus 5 as shown in FIG. 6, insert portion 78 is pressed against the case of power storage apparatus 5 by elastic force of the elastically deformed portion of upper cover 32 (the portion between fastening portion 79 and insert portion 78). Therefore, a gap between insert portion 78 of attachment surface 77 and the case of power storage apparatus 5 can be made smaller by reliably pressing the insert portion against the case. Consequently, entry of electromagnetic field generated from coil 16 into space portion 36 by going around metal plate 35 can appropriately be suppressed.

In insert portion 78 of attachment surface 77, metal member 80 is not covered with a resin but is exposed through upper cover 32. Therefore, while upper cover 32 is attached to the case of power storage apparatus 5, metal member 80 exposed at insert portion 78 of attachment surface 77 can directly be pressed against the case made of a metal of power storage apparatus 5 by elastic force from the elastically deformed portion of upper cover 32. Therefore, entry of electromagnetic field generated from coil 16 into space portion 36 by going around metal plate 35 can more appropriately be suppressed.

As set forth above, coil unit 4 according to the present embodiment includes case 30 made of a resin, the case including attachment surface 77 to be attached to the case of power storage apparatus 5, metal plate 35 provided in case 30, coil 16 located opposite to attachment surface 77 with respect to metal plate 35, and metal member 80 arranged to surround space portion 36 located between metal plate 35 and case 30 (upper cover 32). Therefore, space portion 36 can be made use of as an electrical instrument arrangement space which is less likely to be affected by electromagnetic field. Furthermore, metal member 80 is formed integrally with upper cover 32 made of a resin. Therefore, the number of components accommodated in case 30 can be reduced. Consequently, increase in size of coil unit 4 can be suppressed while an electrical instrument arrangement space is secured in case 30 made of a resin.

<First Modification>

The embodiment described above shows an example in which fourth metal member 84 adjacent to storage case 70 is divided into two parts with discontinuous portion 85 being interposed (see FIG. 4). The construction of fourth metal member 84, however, is not necessarily limited as such.

Figure 7:
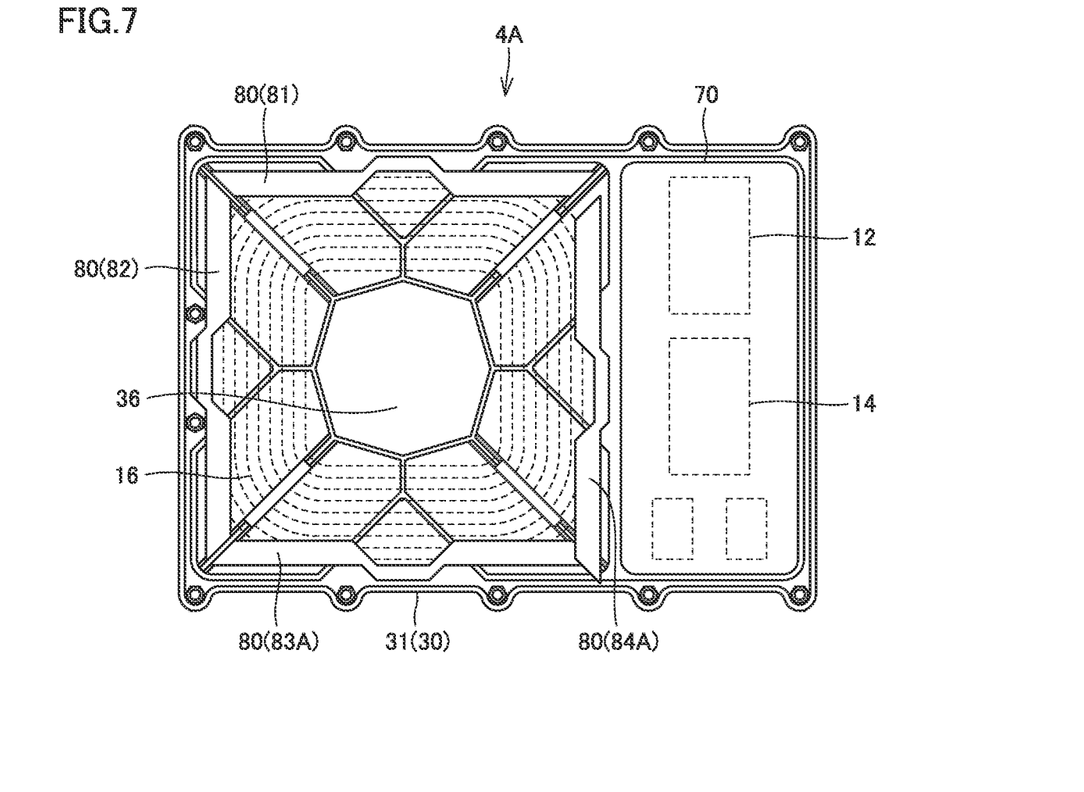
FIG. 7 is a perspective view (No. 2) of the coil unit viewed from above.

FIG. 7 is a perspective view of a coil unit 4A according to the present modification viewed from above. Coil unit 4A shown in FIG. 7 is the same as coil unit 4 shown in FIG. 4 described above except for third metal member 83 and fourth metal member 84 having been replaced with a third metal member 83A and a fourth metal member 84A, respectively.

As shown in FIG. 7, a central portion of fourth metal member 84A is continuous, without discontinuous portion 85 in fourth metal member 84 being provided. Fourth metal member 84 may thus be continuous without being divided.

In the example shown in FIG. 7, fourth metal member 84A is arranged as being closer toward third metal member 83A, and a gap between fourth metal member 84A and first metal member 81 is greater. A harness which electrically connects an electrical instrument in space portion 36 and an electrical instrument in storage case 70 to each other is arranged in this gap.

<Second Modification>

The embodiment described above shows an example in which storage case 70 arranged laterally to coil 16 is provided separately from metal member 80 (see FIG. 4). Storage case 70, however, may be formed integrally with upper cover 32 together with metal member 80.

Figure 8:
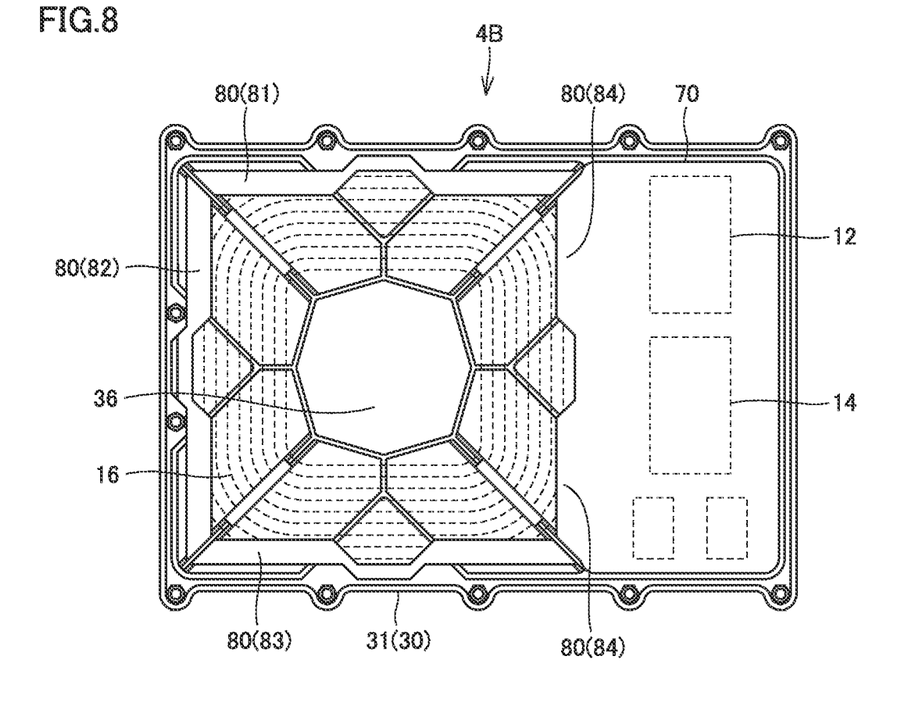
FIG. 8 is a perspective view (No. 3) of the coil unit viewed from above.

FIG. 8 is a perspective view of a coil unit 43 according to the present modification viewed from above. In coil unit 4B shown in FIG. 8, storage case 70 shown in FIG. 4 described above is formed integrally with upper cover 32, with storage case 70 serving also as fourth metal member 84. By doing so, the number of components accommodated in case 30 can further be reduced.

<Third Modification>

The embodiment described above shows an example in which metal member 80 is exposed through upper cover 32 on both of the side of metal plate 35 and the side of attachment surface 77 (see FIGS. 5 and 6). The construction of metal member 80, however, is not limited as such.

Figure 9:
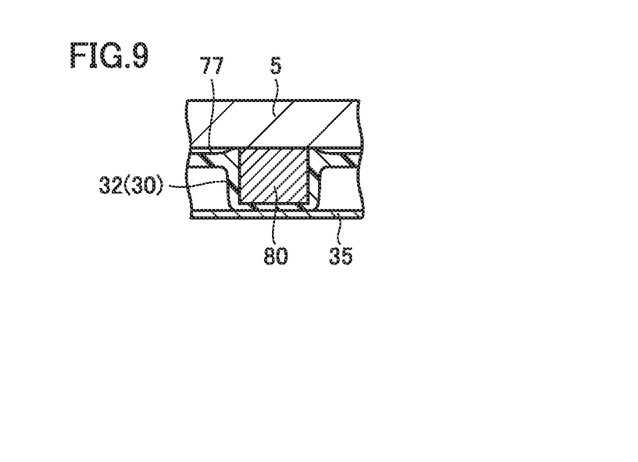
FIG. 9 is a diagram (No. 1) showing a modification of a construction of a metal member.
Figure 10:
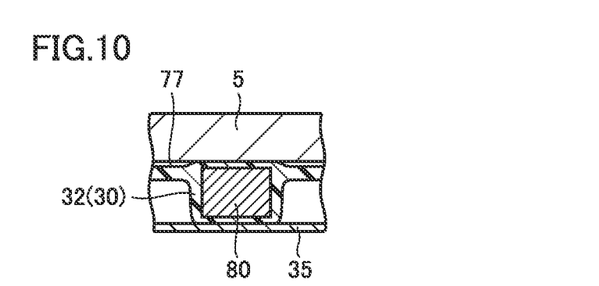
FIG. 10 is a diagram (No. 2) showing a modification of the construction of the metal member.
Figure 11:
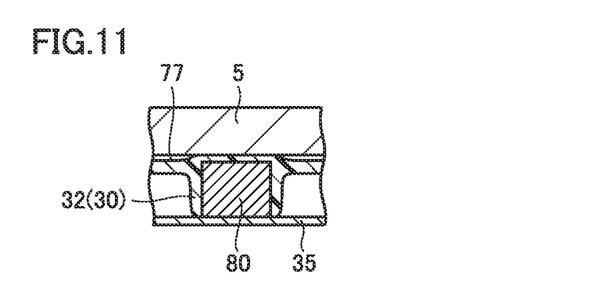
FIG. 11 is a diagram (No. 3) showing a modification of the construction of the metal member.

FIGS. 9 to 11 are diagrams each showing a modification of the construction of metal member 80. As shown in FIG. 9, metal member 80 may be constructed to be exposed without being covered with a resin on the side of attachment surface 77 and to be covered with a thin resin on the side of metal plate 35. Alternatively, as shown in FIG. 10, metal member 80 may be constructed to be covered with a thin resin on both of the side of attachment surface 77 and the side of metal plate 35. Alternatively, as shown in FIG. 11, metal member 80 may be constructed to be covered with a thin resin on the side of attachment surface 77 and to be exposed without being covered with a resin on the side of metal plate 35.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A coil unit to be attached to an externally provided attachment target member, the coil unit comprising:
   a case made of a resin, the case including an attachment surface to be attached to the attachment target member;
   a metal plate provided in the case;
   a coil located opposite to the attachment surface with respect to the metal plate, the coil being embedded within a wall of the case; and
   a metal member arranged between the metal plate and the attachment surface and formed integrally with the case, the metal member being arranged to surround a space located between the metal plate and the case, wherein the case is attached to the attachment target member with a fastening member, wherein the attachment surface of the case is provided with an insert portion where the metal member is provided and a fastening portion pressed against the attachment target member by fastening force from the fastening member while the case is attached to the attachment target member, and wherein the insert portion of the attachment surface protrudes outward relative to the fastening portion of the attachment surface while the case is not attached to the attachment target member.

2. The coil unit according to claim 1, wherein the attachment target member is made of a metal, and the metal member is exposed through the case in the insert portion of the attachment surface.

3. A coil unit to be attached to an externally provided attachment target member, the coil unit comprising:

a case made of a resin, the case including an attachment surface attached to the attachment target member with a fastening member;

a metal plate provided in the case;

a coil located opposite to the attachment surface with respect to the metal plate; and a metal member arranged between the metal plate and the attachment surface and formed integrally with the case, wherein the metal member being arranged to surround a space located between the metal plate and the case, the attachment surface of the case is provided with an insert portion where the metal member is provided and a fastening portion, and the insert portion of the attachment surface protrudes outward relative to the fastening portion of the attachment surface while the case is not attached to the attachment target member.

* * * * *

UNITED STATES PATENT AND TRADEMARK OFFICE
CERTIFICATE OF CORRECTION

PATENT NO. : 10,737,579 B2
APPLICATION NO. : 16/103425
DATED : August 11, 2020
INVENTOR(S) : Taiga Doi It is certified that error appears in the above-identified patent and that said Letters Patent is hereby corrected as shown below:

On the Title Page

Item (72), inventor city, delete "Okazaki" and insert --Okazaki-shi Aichi-ken--, therefor.

In the Specification

Column 3, Line 55, delete "you" and insert --power--, therefor.

Column 4, Line 40, after "including", delete "en" and insert --an--, therefor.

Column 4, Line 48, delete "batter" and insert --battery--, therefor.

Column 7, Line 4, delete "37" and insert --32--, therefor.

Column 8, Line 21, delete "43" and insert --4B--, therefor.

Signed and Sealed this
Fifth Day of January, 2021

Andrei Iancu
*Director of the United States Patent and Trademark Office*